United States Patent [19]
Brewer et al.

[11] 3,750,733
[45] Aug. 7, 1973

[54] QUICK CHANGE-REPLACEABLE TREAD PNEUMATIC TIRE

[76] Inventors: Howell K. Brewer, 1921 N. Longview St., Dayton, Ohio 45432; Aivars V. Petersons, 1925 Little York Rd., Dayton, Ohio 45414

[22] Filed: Dec. 14, 1971

[21] Appl. No.: 207,850

[52] U.S. Cl. ............................................. 152/175
[51] Int. Cl. ............................................. B60c 7/24
[58] Field of Search ..................... 152/176, 175, 187

[56] References Cited
UNITED STATES PATENTS

| | | | |
|---|---|---|---|
| 2,609,026 | 9/1952 | Luchsinger-Caballero | 152/176 |
| 2,921,617 | 1/1960 | Findler | 152/176 |

*Primary Examiner*—James B. Marbert
*Attorney*—Harry A. Herbert, Jr. et al.

[57] ABSTRACT

A vehicular wheel and pneumatic tire assembly including a wheel portion, a tire-carcass portion and a separate tread band portion installed over the uninflated carcass-periphery, and in which the carcass portion is molded into a convoluted shape, when uninflated, that provides its easy stretching over the outside diameter of the wheel and, on application of an inflation pressure, simultaneously ensures both the outward expansion of the carcass-periphery and the inward contraction of the carcass-inside diameter for respective tight-fitting engagement with, and assembly to, the tread band and wheel portions.

3 Claims, 3 Drawing Figures

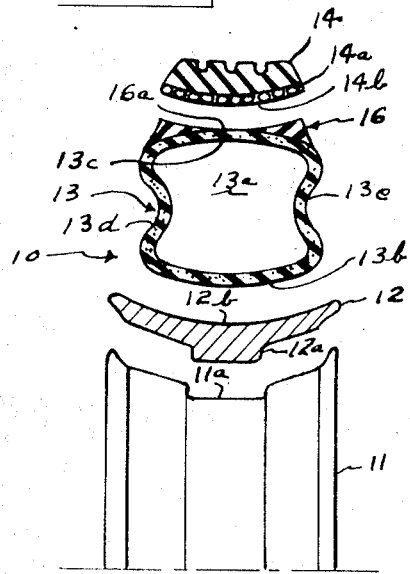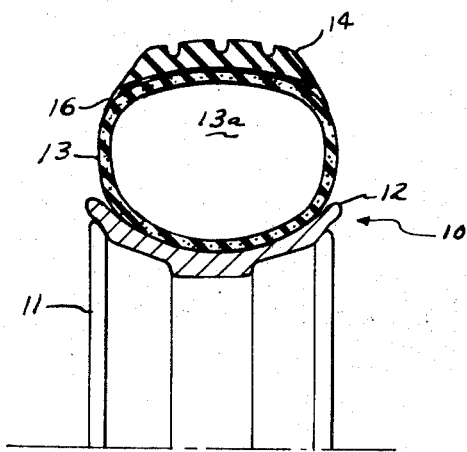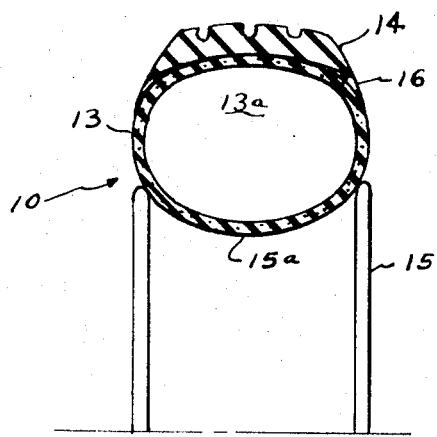

QUICK CHANGE-REPLACEABLE TREAD PNEUMATIC TIRE

BACKGROUND OF THE INVENTION

The present invention relates to a quick-change technique for replacing vehicular tires and constitutes a further development of, and improvement over, a closely related invention developed by one of the present applicants; namely, Mr. Howell K. Brewer, and described and claimed in a copending patent application, Ser. No. 207,849, filed Dec. 14, 1971, and entitled "Quick Change Pneumatic Tire".

In replacing worn and damaged tires mounted on the wheels of various vehicles, including aircraft, the normal practice is to first dismount both tire and wheel as a unit from the vehicle, remove the old tire and assemble a new or retreaded tire on the wheel by the use of certain time-consuming tire-changing equipment and thereafter remounting the wheel to the vehicle. Naturally, it would be a considerable improvement if some means could be developed whereby either one or more of the above-outlined tire-changing steps could be entirely eliminated or, at least, the time and effort involved therein substantially reduced. The reduction of the time and effort and, therefore, the expense required in the changing of vehicular tires is of considerable importance in both commercial and combat operations. In this regard, the tread portion of the tire is often worn out and/or damaged while the tire-carcass remains in good or even excellent condition. This situation is usually resolved either by discarding the entire tire and replacing it with a new or retreaded tire and/or by sending the worn tire to a tire-retreading facility.

In specific regard to the aforementioned problem of the tire-tread portion wearing out before the carcass, or otherwise requiring early replacement due to damage, it is noted that one of the present applicants', namely, Mr. Aivars V. Petersons, previously developed a replaceable tread in another invention, described and claimed in a patent application, Ser. No. 760,931, filed Sept. 19, 1968, on an invention entitled, "Replaceable Tread on an Expanding Diameter Carcass Tire", which application later issued on May 17, 1971 as U.S. Pat. No. 3,578,052. In this connection, the present invention involves a novel combination that constitutes a further development of, and a unique improvement over, the tire assemblies set forth in both of the aforementioned U.S. Pat. No. 3,578,052 and in the "Quick Change Pneumatic Tire" of the previously-referred to copending patent application, as will appear self-evident hereinafter in the following summary and detailed description.

SUMMARY OF THE INVENTION

The present invention consists briefly in a new and improved tire and vehicular wheel assembly that includes a tire-carcass molded into a toroidal configuration and, further made convoluted in form, when uninflated, for facilitating its ready assembly to the wheel, in novel combination with a separate tire tread designed to be easily slipped over the periphery of the uninflated carcass. The tire-carcass is still further molded into a closed shape forming an inflation chamber in itself designed to sustain an inflation pressure introduced thereinto to thereby simultaneously both expand the periphery and inwardly contract the inside diameter of, the tire-carcass for tight-fitting engagement, and assembly as an integral unit with said separate tread and the rim of the wheel, respectively.

Other objects and advantages of the invention will become readily apparent from the following disclosure thereof, taken in connection with the accompanying drawings, in which;

BRIEF DESCRIPTION OF THE DRAWINGS

FIGS. 1 and 2 are cross-sectional and partly schematic views respectively representing the exploded, uninflated and assembled, inflated conditions of the new and improved replaceable tread-quick change wheel and tire assembly of the present invention, with an adapter ring being used on the wheel-rim portion; and FIG. 3 is another cross-sectional and partly schematic view, similar to that of FIG. 2, but illustrating a modified form of the inventive assembly with the adapter ring thereof being omitted therefrom.

DESCRIPTION OF THE PREFERRED EMBODIMENT

Referring specifically to FIGS. 1 and 2, the new and improved pneumatic tire and wheel assembly of the present invention is indicated generally at the reference numeral 10 as including a vehicular wheel 11 of a standard or normal type having the usual rim portion, at 11a, a contoured adapter ring 12, a preferably rubber tire carcass 13 that may be made of a toroidal configuration, and a separate, replaceable tread band 14. As seen clearly in the aforementioned FIG. 1, the tire carcass 13 is further molded into a completely closed form that encloses a sealed vessel or inflation chamber 13a therewithin and, in addition, is still further made convoluted in shape, when uninflated. The collapsed, non-inflated form of the convoluted carcass 13 is depicted in FIG. 1, whereas its inflated, extended form is illustrated in FIG. 2.

The said contoured adapter ring 12, which preferably consists of a cylindrical structure, may be force-fitted on the rim portion 11a of the wheel 11 or otherwise suitably secured thereto by any appropriate mechanical attachment means, such as bolts, screws, keys and the like. To specifically accommodate its mount on the wheel-rim portion 11a, the lower surface of the adapter ring 12 has been specifically configured, as is clearly depicted at 12a in FIG. 1, for example, to precisely interfit with, and match the particular shape of the surface of the aforementioned wheel-rim portion 11a. With the use of the adapter ring 12 being rigidly mounted on the wheel-rim portion 11a, and upon the introduction of an inflating gas means, such as compressed air into the vessel or chamber 13a, the closed, inside diameter-surface portion, indicated generally at 13b in FIG. 1, of the tire-carcass 13 will contract inwardly to a seated position on the upper surface 12b of the said adapter ring 12. To thus provide a suitable seat for the said carcass-inside diameter-surface portion 13b, the aforementioned adapter ring-upper surface 12b is contoured with a concave-like configuration, as shown, with such a contoured, upper-seating surface, as at 12b, the stresses developed by the prevention of the tire carcass 13 from assuming its natural, inflated shape are minimized. At the same time, the gripping force between the tire carcass 13 and the wheel 11 are maximized.

The tire carcass 13 may consist of a cord-reinforced rubber casing, and the reinforcing material thereof may comprise any of a number of available structures, such as textile, steel, glass or any other suitable fiber. The details thereof are not shown, since neither the specific method of manufacture, nor the precise form of the cord is of particular significance to the present invention. The only essential requirement is that the tire carcass 13 be a closed vessel capable of sustaining air pressure by itself and, therefore, in the absence of a wheel. As noted hereinbefore, the uninflated cross-section or, in other words, the meridian shape of the carcass 13 is molded into a convoluted shape, one example of which having been indicated at 13 in FIG. 1, for instance. However, it is to be understood that the convoluted form of the carcass-cross section may comprise any of a number of plane convoluted, closed curves, without departing from the true spirit or scope of the invention. Whichever specific convoluted-type of form is utilized, it is noted that the express purpose of molding the tire-carcass, as for example that shown at 13 in FIG. 1, into a convoluted shape, when uninflated, is in the present application thereof, to specifically provide a novel means inherently built into the carcass 13 for ensuring and positively directing the simultaneous movement of the outside diameter-surface portion or periphery, indicated generally at 13c in FIG. 1, of the tire carcass 13 in an outwardly-expanding direction only, and the inward contraction only of the previously-mentioned inside diameter-surface portion thereof, at 13b. The above-described actions, of course, result from the application of an inflation pressure by the introduction of compressed air into the sealed vessel or chamber 13a of the carcass 13. In this regard, with the aforesaid carcass 13 being molded into the previously-noted convoluted form (FIG. 1), the respective expanding and contracting deflections, described hereinabove for the outside and inside diameter-surface portions 13c and 13b of the carcass 13, are actually rather large and thus provide and positively ensure the existence of a tight grip respectively between the tire carcass 13 and the tread band 14 and the wheel 11.

The above-referred to replaceable tread band 14 may preferably consist of a cylindrical hoop of tread rubber, reinforced with one or more plies of textile, steel or glass fiber, as is schematically depicted in the area of the tread band 14, indicated generally at 14a in FIG. 1. These reinforcing plies 14a may either extend circumferentially around the hoop into which the tread band 14 is formed, or they may cross one another at a particular angle, as desired. In either event, the tread band 14 is made sufficiently large in diameter so that it may be readily installed or slipped around the periphery or outside diameter-surface portion 13c (FIG. 1) of the tire-carcass 13, when the latter is in its uninflated condition and convoluted shape of FIG. 1. Thereafter, when an inflation pressure is applied, as previously discussed, by the introduction of compressed air into the vessel or chamber 13a, the carcass-side walls, indicated generally at 13d and 13e, are automatically straightened with the tire carcass 13 thereby losing its uninflated, convoluted shape and the periphery 13c thereof is thus forced to expand outwardly against, and in a firm and tight-fitting or strong-gripping relation with the tread band 14 to thereby secure the latter in place on the tire carcass 13.

To specifically provide for the positive retention of the said tread band 14 in the correctly assembled position on the tire carcass 13, the aforesaid periphery or outside diameter-surface portion 13c thereof may preferably incorporate in integral relation to its outside surface a cylindrically-shaped, and intermediately-positioned and reinforced tread band-seat means at 16, which seat means 16 may be comprised of the same reinforced tread rubber as is the tread band 14. Said rubber seat means 16 may, as is clearly indicated in the aforesaid FIG. 1, have a contoured upper surface, at 16a, that is naturally concaved in configuration, when the tire carcass 13 is uninflated. To precisely interfit therewith and be seated therein during both its initial assembly over the periphery 13c and its subsequent tight gripping contact with the tire casing 13, the inside diameter-surface 14b of the tread band 14 is made convex in configuration (FIG. 1) to exactly match and intermesh with the contoured (concaved) upper surface 16a of the seat means 16. Of course, when the tire casing 13 has been fully inflated for providing the previously described tight-fitting grip between the carcass-periphery 13c and thus in particular the seat means 16 thereof, and the tread band 14, the outward expansion of the previously convoluted shaped-tire carcass 13 results in each of the upper surface 16a of the said carcass-periphery 13c and the inside diameter-surface 14b of the tread band 14 naturally assuming a reversed curvature, or, in other words, the automatic changing of the initially concave shape of the surface 16a to a convex form and the originally convex shape of the tread band-inside diameter-surface 14b to a concave shape, as is depicted in FIG. 2, for example. This change in the contour of each of the aforesaid meshing surfaces 16a and 14b is calculated to thereby provide a more positive grip between the tire and tread.

The previously described contoured seating and adapter ring 12 may, as is illustrated in the modified form of the invention of FIG. 3, be omitted from the present tire and wheel assembly 10 and, in place thereof, the rim portion, indicated at 15a in said FIG. 3, of the wheel 15, made into the same specially contoured configuration. In this alternative, on the inflation thereof, the tire carcass 13 would, of course, directly contact and grip the said wheel-rim portion 15a. In either case, whether or not the adapter ring 12 is used, the pneumatic tire and wheel assembly 10 of the present invention uniquely couples a separate tread band, as at 14, in novel combination with the previously-described tire carcass, at 13, that is specifically molded into a convoluted shape, when uninflated, for thereby initially ensuring the easy initial installation of the separate tread band 14 over the carcass-periphery 13c and thereafter the subsequent outward expansion of the said carcass-periphery, simultaneously, with the inward contraction of the carcass-inside diameter-surface portion 13b for quickly and effectively gripping both the tread band 14 to the carcass 13 and the latter to the wheel 12 or 15 to thereby form one integral assembly in a very rapid and easy manner.

Thus, a new and improved pneumatic tire and wheel assembly has been developed by the present invention, in which the necessity of first dismounting the vehicle wheel when changing tires because of puncture, wear, or any other reason has, in many instances, been eliminated, thus reducing significantly the work and vehicle-downtime usually involved with normal techniques, particularly on trucks, and other heavy vehicles. The novel replaceable tread band 14 of the present system may also consist, alternatively, of the mud and/or snow tread form for easy substitution on the vehicle wheel, during winter driving conditions, for example.

We claim:

1. A quick-change pneumatic tire and wheel assembly comprising; a first, vehicular wheel portion; a second, separate tire tread portion; a third, tire carcass portion having combined, built-in means inflatable on the introduction of an inflating, compressed gas thereinto for adjustment between a first, non-inflated and collapsed position permitting the manual installation of said separate tread portion over the uninflated tire carcass portion, and a second, inflated position automatically and simultaneously expanding the periphery and inwardly contracting the inside diameter of, said tire carcass portion to a firmly gripping relation respectively with said tire tread and vehicular wheel portions; and resilient, interconnecting means mounted on the periphery of said third, tire carcass portion, and intermediately disposed between said third, tire carcass portion and said second, tire tread portion; said resilient, interconnecting means constituting a tire tread portion-seat receiving means comprising an arcuate-shaped element integrally formed on the periphery of said third, tire carcass portion.

2. In a quick-change pneumatic tire as in claim 1, wherein said second, separate tire tread portion incorporates an inside diameter surface normally of a convexed configuration when said carcass is uninflated; and the tire tread portion-seat receiving means comprising said resilient, interconnecting means having a concaved upper surface in matching engagement with, and thereby being positively retained by, the convexed inside diameter surface of said tire tread portion.

3. A quick-change pneumatic tire and wheel assembly comprising; a first, vehicular wheel portion; a second, separate tire tread portion; a third, tire carcass portion having combined, built-in means inflatable on the introduction of an inflating, compressed gas thereinto for adjustment between a first, non-inflated and collapsed position permitting the manual installation of said separate tread portion over the uninflated tire carcass portion, and a second, inflated position automatically and simultaneously expanding the periphery and inwardly contracting the inside diameter of, said tire carcass portion to a firmly gripping relation respectively with said tire tread and vehicular wheel portions; said combined, built-in means of said third, tire carcass portion comprising; a first, outside diameter section comprising the tread-engaging outer periphery of said tire carcass portion; a second, intermediately-positioned section comprising the side walls of said tire carcass portion supporting and integrally formed with said outer periphery; and a third, inside diameter section comprising the vehicular wheel-engaging surface of said tire carcass portion; said first, second and third-named sections of said tire carcass portion all being integrally united into a closed configuration made in the form of a torous of revolution and convoluted, when uninflated, for facilitating and thereby positively providing for the said simultaneous and substantial outward expansion of the carcass-outer periphery section and the inward contraction of said third, inside diameter section in respective tight-gripping contact with said second, separate tire tread portion and said first, wheel portion when said tire carcass portion is inflated.

* * * * *